(12) United States Patent
Maltzman

(10) Patent No.: US 7,870,058 B2
(45) Date of Patent: *Jan. 11, 2011

(54) DUAL PURCHASE PROCESS WITHIN AN ONLINE AUCTION ENVIRONMENT

(75) Inventor: Reed Maltzman, San Francisco, CA (US)

(73) Assignee: eBay Inc., San Jose, CA (US)

( * ) Notice: Subject to any disclaimer, the term of this patent is extended or adjusted under 35 U.S.C. 154(b) by 300 days.

This patent is subject to a terminal disclaimer.

(21) Appl. No.: 11/776,059

(22) Filed: Jul. 11, 2007

(65) Prior Publication Data

US 2008/0015971 A1 Jan. 17, 2008

Related U.S. Application Data

(63) Continuation of application No. 09/820,574, filed on Mar. 28, 2001, now Pat. No. 7,340,429.

(60) Provisional application No. 60/242,729, filed on Oct. 23, 2000.

(51) Int. Cl.
*G06Q 40/00* (2006.01)

(52) U.S. Cl. ............... 705/37; 705/35; 705/36 R; 705/26; 705/27; 705/28

(58) Field of Classification Search .......... 705/35–37, 705/26–28
See application file for complete search history.

(56) References Cited

U.S. PATENT DOCUMENTS

| 3,573,747 | A | 4/1971 | Adams et al. |
| 3,581,072 | A | 5/1971 | Nymeyer |
| 4,412,287 | A | 10/1983 | Braddock, III |
| 4,674,044 | A | 6/1987 | Kalmus et al. |
| 4,677,552 | A | 6/1987 | Sibley, Jr. |
| 4,789,928 | A | 12/1988 | Fujisaki |
| 4,799,156 | A | 1/1989 | Shavit et al. |
| 4,823,265 | A | 4/1989 | Nelson |
| 4,864,516 | A | 9/1989 | Gaither et al. |
| 4,903,201 | A | 2/1990 | Wagner |
| 5,063,507 | A | 11/1991 | Lindsey et al. |
| 5,077,665 | A | 12/1991 | Silverman et al. |
| 5,101,353 | A | 3/1992 | Lupien et al. |

(Continued)

FOREIGN PATENT DOCUMENTS

CA 2253543 A1 3/1997

(Continued)

OTHER PUBLICATIONS

"U.S. Appl. No. 09/820,574, 312 Amendment filed Dec. 20, 2006", 8 pgs.

(Continued)

*Primary Examiner*—Narayanswamy Subramanian
(74) *Attorney, Agent, or Firm*—Schwegman, Lundberg & Woessner, P.A.

(57) ABSTRACT

Methods are provided for a dual purchase process. The method includes enabling, via a first computer system, both an auction purchase process and a fixed-price purchase process for purchase of an item. In addition, responsive to receipt of a bid for the item, the method includes disabling the fixed-price purchase process.

9 Claims, 10 Drawing Sheets

U.S. PATENT DOCUMENTS

| | | | |
|---|---|---|---|
| 5,136,501 A | | 8/1992 | Silverman et al. |
| 5,168,446 A | | 12/1992 | Wiseman |
| 5,205,200 A | | 4/1993 | Wright |
| 5,243,515 A | | 9/1993 | Lee |
| 5,258,908 A | | 11/1993 | Hartheimer et al. |
| 5,280,422 A | | 1/1994 | Moe et al. |
| 5,297,031 A | | 3/1994 | Gutterman et al. |
| 5,297,032 A | | 3/1994 | Trojan et al. |
| 5,305,200 A | | 4/1994 | Hartheimer et al. |
| 5,325,297 A | | 6/1994 | Bird et al. |
| 5,329,589 A | | 7/1994 | Fraser et al. |
| 5,375,055 A | | 12/1994 | Togher et al. |
| 5,394,324 A | | 2/1995 | Clearwater |
| 5,426,281 A | | 6/1995 | Abecassis |
| 5,485,510 A | | 1/1996 | Colbert |
| 5,553,145 A | | 9/1996 | Micali |
| 5,557,728 A | | 9/1996 | Garrett et al. |
| 5,596,994 A | | 1/1997 | Bro |
| 5,598,557 A | | 1/1997 | Doner et al. |
| 5,640,569 A | | 6/1997 | Miller et al. |
| 5,657,389 A | | 8/1997 | Houvener |
| 5,664,115 A | | 9/1997 | Fraser |
| 5,689,652 A | | 11/1997 | Lupien et al. |
| 5,694,546 A | | 12/1997 | Reisman |
| 5,706,457 A | | 1/1998 | Dwyer et al. |
| 5,710,889 A | | 1/1998 | Clark et al. |
| 5,715,314 A | | 2/1998 | Payne et al. |
| 5,715,402 A | | 2/1998 | Popolo |
| 5,717,989 A | | 2/1998 | Tozzoli et al. |
| 5,722,418 A | | 3/1998 | Bro |
| 5,727,165 A | | 3/1998 | Ordish et al. |
| 5,771,291 A | | 6/1998 | Newton et al. |
| 5,771,380 A | | 6/1998 | Tanaka et al. |
| 5,790,790 A | | 8/1998 | Smith et al. |
| 5,794,219 A | | 8/1998 | Brown |
| 5,799,285 A | | 8/1998 | Klingman |
| 5,803,500 A | | 9/1998 | Mossberg |
| 5,818,914 A | | 10/1998 | Fujisaki |
| 5,826,244 A | | 10/1998 | Huberman |
| 5,835,896 A | | 11/1998 | Fisher et al. |
| 5,845,265 A | | 12/1998 | Woolston |
| 5,845,266 A | | 12/1998 | Lupien et al. |
| 5,850,442 A | | 12/1998 | Muftic |
| 5,872,848 A | | 2/1999 | Romney et al. |
| 5,873,069 A | | 2/1999 | Reuhl et al. |
| 5,884,056 A | | 3/1999 | Steele |
| 5,890,138 A | | 3/1999 | Godin et al. |
| 5,905,974 A | | 5/1999 | Fraser et al. |
| 5,905,975 A | | 5/1999 | Ausubel |
| 5,922,074 A | | 7/1999 | Richard et al. |
| 5,924,072 A | | 7/1999 | Havens |
| 5,926,794 A | | 7/1999 | Fethe |
| 5,970,470 A | * | 10/1999 | Walker et al. ............ 705/14.27 |
| 5,974,412 A | | 10/1999 | Hazlehurst et al. |
| 5,991,739 A | | 11/1999 | Cupps et al. |
| 6,035,402 A | | 3/2000 | Vaeth et al. |
| 6,044,363 A | * | 3/2000 | Mori et al. .................... 705/37 |
| 6,047,264 A | | 4/2000 | Fisher et al. |
| 6,047,274 A | | 4/2000 | Johnson |
| 6,055,518 A | | 4/2000 | Franklin et al. |
| 6,058,417 A | * | 5/2000 | Hess et al. .................. 709/219 |
| 6,061,448 A | | 5/2000 | Smith et al. |
| 6,073,117 A | | 6/2000 | Oyanagi et al. |
| 6,085,176 A | | 7/2000 | Woolston |
| 6,101,484 A | | 8/2000 | Halbert et al. |
| 6,104,815 A | | 8/2000 | Alcorn et al. |
| 6,119,137 A | | 9/2000 | Smith et al. |
| 6,151,589 A | * | 11/2000 | Aggarwal et al. ......... 705/36 R |
| 6,178,408 B1 | | 1/2001 | Copple et al. |
| 6,192,407 B1 | | 2/2001 | Smith et al. |
| 6,202,051 B1 | * | 3/2001 | Woolston .................... 705/27 |
| 6,230,146 B1 | * | 5/2001 | Alaia et al. .................... 705/37 |
| 6,243,691 B1 | | 6/2001 | Fisher et al. |
| 6,249,772 B1 | * | 6/2001 | Walker et al. ................. 705/26 |
| 6,260,024 B1 | * | 7/2001 | Shkedy ......................... 705/37 |
| 6,536,935 B2 | * | 3/2003 | Parunak et al. ............... 700/99 |
| 6,598,027 B1 | * | 7/2003 | Breen et al. ................... 705/26 |
| 6,684,196 B1 | * | 1/2004 | Mini et al. .................... 705/26 |
| 7,006,987 B1 | | 2/2006 | Xie et al. |
| 7,099,839 B2 | * | 8/2006 | Madoff et al. ................. 705/37 |
| 7,099,841 B1 | * | 8/2006 | Hall et al. ..................... 705/37 |
| 7,107,227 B1 | * | 9/2006 | Bezos et al. .................. 705/26 |
| 7,124,107 B1 | * | 10/2006 | Pishevar et al. ............... 705/37 |
| 7,191,147 B2 | * | 3/2007 | Heene et al. .................. 705/26 |
| 7,340,429 B2 | * | 3/2008 | Maltzman ..................... 705/37 |
| 7,428,500 B1 | * | 9/2008 | Linden ......................... 705/26 |
| 7,461,022 B1 | | 12/2008 | Churchill et al. |
| 7,593,866 B2 | | 9/2009 | Grove et al. |
| 7,647,267 B2 | * | 1/2010 | Burkhardt et al. ............. 705/37 |
| 7,650,307 B2 | | 1/2010 | Stuart |
| 2001/0044767 A1 | * | 11/2001 | Madoff et al. ................. 705/37 |
| 2001/0049648 A1 | * | 12/2001 | Naylor et al. ................. 705/37 |
| 2002/0002513 A1 | * | 1/2002 | Chiasson ...................... 705/27 |
| 2002/0026400 A1 | * | 2/2002 | Narayan et al. ............... 705/37 |
| 2002/0107779 A1 | | 8/2002 | Maltzman |
| 2003/0004850 A1 | * | 1/2003 | Li et al. ........................ 705/37 |
| 2003/0093355 A1 | * | 5/2003 | Issa .............................. 705/37 |
| 2003/0187714 A1 | | 10/2003 | Perry |
| 2003/0204449 A1 | | 10/2003 | Kotas et al. |
| 2004/0024682 A1 | | 2/2004 | Popovitch |
| 2004/0254853 A1 | * | 12/2004 | Heene et al. .................. 705/26 |
| 2005/0027641 A1 | | 2/2005 | Grove et al. |
| 2005/0273417 A1 | | 12/2005 | Budish |
| 2006/0015436 A1 | | 1/2006 | Burns et al. |
| 2006/0190387 A1 | * | 8/2006 | Molloy ......................... 705/37 |
| 2006/0190388 A1 | * | 8/2006 | Molloy ......................... 705/37 |
| 2006/0190389 A1 | * | 8/2006 | Molloy ......................... 705/37 |
| 2006/0190390 A1 | * | 8/2006 | Molloy ......................... 705/37 |
| 2006/0259406 A1 | | 11/2006 | Kemp et al. |
| 2006/0259409 A1 | | 11/2006 | Burns et al. |
| 2007/0022040 A1 | * | 1/2007 | Gordon ......................... 705/37 |
| 2008/0133400 A1 | * | 6/2008 | Molloy ......................... 705/37 |

FOREIGN PATENT DOCUMENTS

| | | |
|---|---|---|
| FR | 2658635 A1 | 8/1991 |
| NL | 9300266 | 2/1993 |
| WO | WO-9215174 A1 | 9/1992 |
| WO | WO-9517711 A1 | 6/1995 |
| WO | WO-9634356 A1 | 10/1996 |
| WO | WO-9737315 A1 | 10/1997 |
| WO | WO-9963461 A1 | 12/1999 |

OTHER PUBLICATIONS

"U.S. Appl. No. 09/820,574, Advisory Action mailed Mar. 20, 2006", 2 pgs.

"U.S. Appl. No. 09/820,574, Appeal Brief filed May 4, 2006", 21 pgs.

"U.S. Appl. No. 09/820,574, Comments on Stated Reasons for Allowance filed Jul. 12, 2007", 2 pgs.

"U.S. Appl. No. 09/820,574, Examiner Interview Summary filed Aug. 28, 2007", 2 pgs.

"U.S. Appl. No. 09/820,574, Examiner Interview Summary filed Nov. 28, 2005", 3 pgs.

"U.S. Appl. No. 09/820,574, Examiner Interview Summary mailed Sep. 6, 2007", 3 pgs.

"U.S. Appl. No, 09/820,574, Examiner Interview Summary mailed Oct. 25, 2005", 4 pgs.

"U.S. Appl. No. 09/820,574, Final Office Action mailed Jan. 4, 2006", 18 pgs.

"U.S. Appl. No. 09/820,574, Non-Final Office Action mailed Jun. 27, 2005", 19 pgs.

"U.S. Appl. No. 09/820,574, Notice of Allowance mailed Oct. 4, 2007", 8 pgs.

"U.S. Appl. No, 09/820,574, Response filed Mar. 6, 2006 to Final Office Action mailed Jan. 4, 2006", 6 pgs.

"U.S. Appl. No. 09/820,574, Response filed Nov. 2, 2005 to Non-Final Office Action mailed Jun. 27, 2005", 14 pgs.

"Autodaq Creates Online Marketplace for Used Auto Industry", *Business Wire*, (Jan. 17, 2000).

"Onsale Joins Fray as Online Shopping Picks Up Speed: Internet Booms", *Computer Reseller News*, CMP Publications, Inc., USA, (Jun. 5, 1995), 1.

"Onsale: Onsale Brings Thrill of Auctions and Bargain Hunting Online; Unique Internet retail service debuts with week-long charity auction for the Computer Museum in Boston", *Business Wire*, Dialog Web, 0489267 BW0022, (May 24, 1995), 3 pages.

"Top: Toys, Bean Bag Plush: Action Figures: Geberal", http ://web.archive.org/web.*/http://ebay.com, (Nov. 27, 1999), pp. 3.

Anon, "Europe Gets Online Auction and Haggling Site", *Newsbytes News Network*, (May 10, 2000).

Baumann, G. W, "Personal Optimized Decision/Transaction Program", *IBM Technical Disclosure Bulletin*,,(Jan. 1995), 83-84.

Budish, Eric B, et al., "Buy Price in online auctions: irrationality on the internet?", *Economics Letters*, (2001), 325-333.

Clemons, E, "Evaluating the prospects for alternative electronic securities", *Proceedings of ICIS 91; 12th International Conference on Information Systems*, (Dec.16-18, 1991), 53-61.

Duey, R., "Supply-Side-E-conomics", *Oil & Gas Investor*, (May 2000), 24-26 pgs.

Graham, I, "The Emergence of Linked Fish Markets in Europe", *Focus Theme*, 1-3.

Hauser, R, "Anonymous Delivery of Goods in Electronic Commerce", *IBM Technical Disclosure Bulletin*, 39(3) , (Mar. 1996), 363-366.

Hess, C M, et al., "Computerized Loan Organization System: An Industry Case Study of the Electronic Markets Hypothesis", *MIS Quarterly*, vol. 18(3), (Sep. 1994), 251-274.

Hidvegi, Zoltan, et al., "Buy-price English Auction", (Sep. 1, 2002), 28 Pages.

Hof., R. D, et al., *eBay Vs. Amazon.com*, Business Week 3631, (May 31, 1999), 128.

Klein, S, "Introduction to Electronic Auctions", *Focus Theme*, 1-4.

Lee, H G, "Aucnet: Electronic Intermediary for Used-Car Transactions", *Focus Theme*,1-5.

Lee, H. G, "Electronic brokerage and electronic auction: the impact of IT on market structures", *Proceedings of the Twenty-Ninth Hawaii International Conference on System Sciences*, vol. 4, (1996), 397-406.

Lucking-Reiley, David, "Auctions on the Internet: What's being auctioned, and how?", *The journal of industrial economics*. vol. XLVIII, No. 3, (Sep. 2000), 227-252.

Malone, T., et al., "Electronic Markets and Electronic Hierarchies", *Communications of the ACM*, (Jun. 1987), vol. 14, Issue 25.

Mardesich, Jodi, "Site Offers Clearance for End-of-Life Products—Onsale Takes Auction Gavel Electronic", *Computer Reseller News*, (Jul. 8, 1996), 2 pages.

Massimb, Marcel, "Electronic Trading, Market Structure and Liquidity", *Financial Analysts Journal*, 50(1), (Jan./Feb. 1994), 39-50.

Mathews, Timothy, "A Risk Averse Seller in a Continuous Time Auction with a Buyout Option", (Sep. 12, 2002), 26 Pages.

Meade, J., "Visual 360: A Performance Appraisal System That's 'Fun'" *HR Magazine*, Society for Human Resource Management., (Jul. 1999), 3 pgs.

Neo, B S, "The implementation of an electronic market for pig trading in Singapore", *Journal of Strategic Information Systems*: vol. 1(5), (Dec. 1992), 278-288.

Post, D L, et al., "Application of auctions as a pricing mechanism for the interchange of electric power", *IEEE Transactions on Power Systems*, 10(3), (Aug. 1995), 1580-1584.

Preist, Chris, et al., "Adaptive Agents in a Persistent Shout Double Auction", *International Conference on Information and Computation Economies, Proceedings of the first international conference on Information and computation economies*, (1999), 11-18.

Reck, M., "Formally Specifying an Automated Trade Execution System", *The Journal of Systems and Software*, 1993, Elsevier Science Publishing, USA, (1993), 245-252.

Reck, Martin, "Trading-Process Characteristics of Electronic Auctions", *Focus Theme*, 1-7.

Resnick, Paul, "Reputation systems", *Communications of the ACM*, 43(12), (Dec. 2000), 45-48.

Reynolds, Stanley S, et al., "Ascending Bid Auctions with a Buy-Now Price", (Aug. 2002), 29 Pages.

Rockoff, T E, et al., "Design of an Internet-based system for remote Dutch auctions", *Internet Research: Electronic Networking Applications and Policy*, vol. 5(4), (Jan. 1, 1995), 10-16.

Schmid, B F, "The Development of Electronic Commerce", *EM—Electronic Markets*, No. 9-10, (Oct. 1993), 2 pgs.

Siegmann, Ken, "Nowhere to go but up", *PC Week*: vol, 12(42), Ziff-Davis Publishing Company, (Oct. 23, 1995), 1-3.

Steiner, Ina, "From the Editor", *Auction Bytes newsletter, Autionbytes-Update No. 8, ISSN* 1529-6703, (Feb. 20, 2000), 2 Pages.

Tjostheim, Ingvar, "A case study of an on-line auction for the World Wide Web", *Norwegian Computing Center (NR)*, 1-10.

Turban, E, "Auctions and Bidding on the Internet: An Assessment", *Focus Theme*, 1-5.

Van Heck, E., et al., "Experiences with Electronic Auctions in the Dutch Flower Industry", *Focus Theme, Erasmus University*, The Netherlands.

Wang, X., et al., ""When Auction Meets Fixed Price: A Theoretical and Empirical Examination of Buy-it-Now Auctions,"", *working paper retrieved from the Internet Archive*, (Jun. 2004).

Warbelow, A, et al., "Aucnet: TV Auction Network System", *Harvard Business School Case/Study*, HBVR#9-190-001, USA, (Jul. 1989), 1-15.

Zwass, V., "Electronic; Commerce: Structures and Issues", *International Journal of Electronic Commerce*, Fall 1996, vol. 1, No. 1, (Fall 1996), 3-23.

U.S. Appl. No. 11/167,999, Notice of Allowance mailed Sep. 2, 2009, 10 pgs.

U.S. Appl. No. 11/613,318, Final Office Action mailed Jan. 25, 2010, 18 pgs.

U.S. Appl. No. 11/613,318, Response filed Oct. 12, 2009 to Non Final Office Action mailed Jul. 10, 2009, 10 pgs.

European Application No. 01979435.3, Office Action mailed on Nov. 17, 2009, 13 pgs.

U.S. Appl. No. 11/167,999, Notice of Allowance mailed Sep. 2, 2009, 9 pgs.

U.S. Appl. No. 11/613,318, Advisory Action mailed Apr. 6, 2010, 3 pgs.

U.S. Appl. No. 11/613,318, Examiner Interview Summary mailed Jul. 2, 2010, 2 pgs.

U.S. Appl. No. 11/613,318, Response filed Mar. 25, 2010 to Final Office Action mailed Jan. 25, 2010, 11 pgs.

U.S. Appl. No. 11/613,318, Supplemental Amendment filed Aug. 2, 2010, 6 pgs.

"U.S. Appl. No. 11/613,318 Notice of Allowance mailed Sep. 7, 2010", 7 pgs.

* cited by examiner

/— 500

Sell Your Item  *Related Links:* • New to Selling? • Seller Tips • Fees • Registration
• Free Shipping Estimates from iShip.com

- Your User ID: [    ]
You can also use your email address.

Your Password: [    ]

Title required | [    ]
(45 characters max; no HTML tags, asterisks, or quotes, as they interfere with Search) see tips

Category (Choose one category only; be as specific as possible.)
required
Antiques & Art:
[    ▼]

Description required | [    ]

513
Buy It Now NEW!
Sell your item instantly to the first buyer who meets your specified price.

The Buy It Now price is only available before bids appear.
Learn more

Buy It Now - Special Holiday Promotion
Free during Holiday promotion
$ [    ] Enter the Buy It Now price
e.g. 20.00 -- Please do not include commas or currency symbols, like $.

Buy It Now is not currently available for multiple item auctions.

We recommended Buy It Now with Instant Purchase through eBay Online Payments (available below.)

Search tips

All Regions ▼

☐ Search only in Collectibles
☐ Search titles and descriptions

℃ollectibles

| Advertising | Cultural *cont'd* | Paper *cont'd* |
|---|---|---|
| General | Hawaiiana | Brochures |
| Airlines | Japanese | Documents |
| Auto | Korean | Ephemera |
| Bakery | Latin American | Greeting Cards |
| Bus | Native | Matchbooks |
| Candy | Americana | Menus |
| Cereal | Russian | Newspapers |
| Character | Western | Playing Cards |
| Cigarette | Americana | Postcards |
| Clocks | | Scrapbooks |
| Coffee | Decorative | |
| Dairy | General | Pez |
| Displays | ANRI | General |
| Distillery | Armani | Current |
| Dolls | Avon Works | Vintage (no feet) |

[_____] [Search] tips
☑ Search only in Collectibles
☐ Search titles and descriptions Updated: Oct 13, 2000
06:31:09
PDT Related Topics: China & Pottery Theme Page | Dept 56 | Glass

1069 Bells Items in All

| All Items | All items including Gallery preview | Gallery Items |

| Status | Featured Items - Current | Price | Bids | Ends PDT |

There are no featured items in this category.
To find out how to be listed in this section and seen by thousands, please visit this link Featured Auctions Buy-It-Now

| Status | Current Items - Current | Price | Bids | Ends PDT |
|---|---|---|---|---|
| 🎁 | 2GOLD Alpine Bells, medium and small | $3.99 | - | 10/23 06:15 |
| 🎁 | Pickard China 1980 CHRISTMAS BELL | $15.00 | - | 10/20 06:07 |
| 🎁 | Crown and Rose 1979 Xmas bell PEWTER | $12.00 | - | 10/20 06:06 |
| 🎁 | Crown & Rose 1978 PEWTER Christmas bell, #1 | $9.95 | - | 10/20 06:05 |
| 🎁 | Kaiser (Germany) 1981 Annual Christmas Bell | $12.00 | - | 10/20 06:05 |
| 🎁 | Kaiser 1980 Christmas Bell in White Bisque | $12.00 | - | 10/20 06:05 |
| 🎁 | Kaiser (Germany) 1979 Annual Christmas Bell | $8.00 | - | 10/20 06:04 |
| 🎁 | KAISER Cobalt Blue 1978 Xmas bell, Germany | $8.00 | - | 10/20 06:04 |
| 🎁 | Three Bell(s) Some Collectible; Low Price | $5.00 | - | 10/20 06:03 |
| 🎁 | Large Crystal Bell with Four Women | $9.99 | - | 10/20 04:47 |

| Description |
|---|
| I HAVE A BENNINGTON POTTERY SHACK TRAY IT IS MARKED ON BACK. IT IS IN MINT |
| Free Honesty Counters Image Hosting, Listing Tools and Message Boards |
| Bidding |

BENNINGTON POTTERY TRAY
Item #430507896

Opening bid:      $8.99
Your maximum bid:    [ ]
(Minimum bid: $8.99)

520

[ Review bid ]

eBay will bid on your behalf up to your maximum bid, which is kept secret from other this is called proxy bidding.
Your bid or purchase is a contract - Buy or place a bid only if you're serious about the item. If you are the winning bidder, you will enter into a legally binding contract to purchase the item from the seller.
Buy It Now no longer available - This Item was listed with a Buy It Now price which is no longer available since bidding has started. Learn more

How to Bid
1. Register to bid - If you haven't already. It's free!
2. Learn about this seller - read feedback comments left by others.
3. Know the details - read the item description and payment & shipping terms closely.
4. If you have questions - contact the seller inwinning before you bid.
5. Place your bid!

eBay purchases are insured.

Buy It Now Price:   $52.00

Your User ID:   [ ]
You can also use your email address.

504

Your Password:   [ ]
Forgot your password?

Save time by signing in. (You may also sign in securely).

| [Buy It Now] | On the next page, you'll be asked for credit card or alternative verification if your card is not already on file with us.<br>Your credit card will not be charged. |

Your purchase is a contract - Buy only if you're serious about the item. You will enter into a legally binding contract to purchase the item from the seller.

FIG. 9

DUAL PURCHASE PROCESS WITHIN AN ONLINE AUCTION ENVIRONMENT

RELATED APPLICATIONS

The present application is a continuation of U.S. patent application Ser. No. 09/820,574 filed Mar. 28, 2001, now U.S. Pat. No. 7,340,429 which claims priority from U.S. Provisional Application Ser. No. 60/242,729 filed Oct. 23, 2000, which applications are incorporated herein by reference.

FIELD

The present application relates generally to the field of e-commerce and, more specifically, to a pre-auction seller determined price for an Internet-based auction facility.

BACKGROUND

Many Internet-based auction facilities have developed in the past several years. Through Internet-based auction facilities, potential sellers can enter information about their product or service for potential buyers to bid on. The information submitted by potential sellers is then organized and stored by the Internet-based auction facility. Potential buyers can search through the organized seller information to find products or services they wish to bid on.

Once a buyer locates an item to bid on, the buyer can compete with other buyers for the item by submitting bids during a specified auction time period. At the end of the specified auction time period, the highest bid buyer is notified and the transaction between the seller and the highest bid buyer is facilitated.

While the current Internet-based auction facility works well for some items, there are several disadvantages. For example, many items in an Internet-based auction facility have at most one bid during the specified auction time. An interested buyer must sometimes wait days for an auction to end even though his bid is the only bid received. Also, there are many potential buyers who don't like auction formats.

BRIEF DESCRIPTION OF THE DRAWINGS

The methods and machine readable medium is illustrated by way of example and not limitation in the figures of the accompanying drawings, in which like references indicate similar elements and in which:

FIG. 6 illustrates an exemplary seller interface to receive information on seller's offerings;

FIG. 7 illustrates an exemplary buyer interface to facilitate a buyer in locating items to purchase or bid on;

FIG. 8 illustrates an exemplary item list generated in response to buyer's category selection or search criteria provided in the user interface of FIG. 7; and FIG. 9 illustrates an exemplary buyer interface used to receive buyer information including an indication to use the fixed-price purchase process or the auction purchase process.

DETAILED DESCRIPTION

Methods and machine readable mediums for providing an option to sell and buy at a pre-auction seller determined price in an Internet-based auction facility are described. In the following description, for purposes of explanation, numerous specific details are set forth in order to provide a thorough understanding. Nevertheless, it will be evident, however, to one skilled in the art that the claimed methods and machine readable mediums may be practiced without these specific details.

Terminology

For the purposes of the present specification, the term "transaction" shall be taken to include any communications between two or more entities and shall be construed to include, but not be limited to, commercial transactions including sale and purchase transactions, auctions and the like.

Transaction Facility

Figure 1:
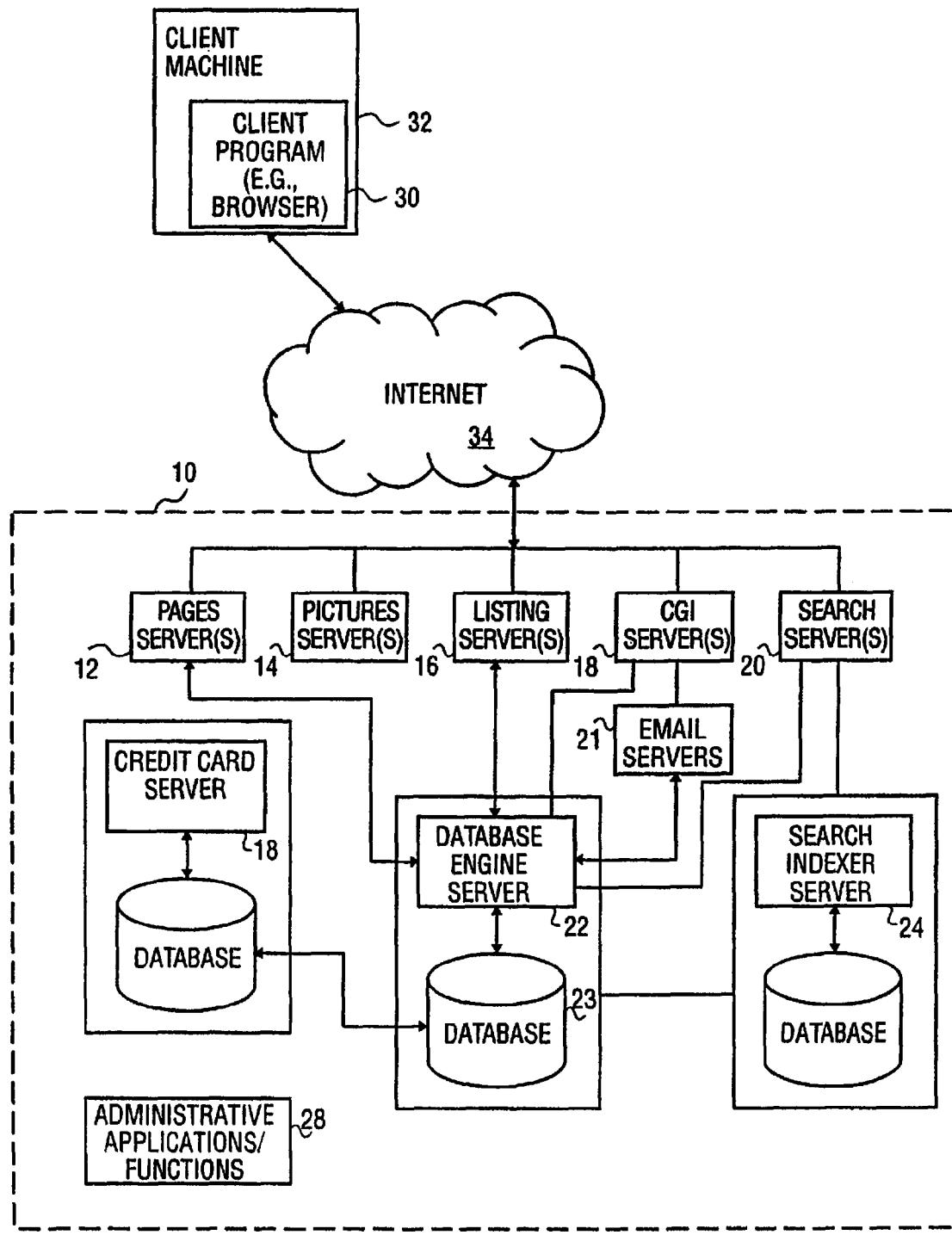
FIG. 1 is a block diagram illustrating an exemplary network-based transaction facility in the form of an Internet-based auction facility.
Figure 2:
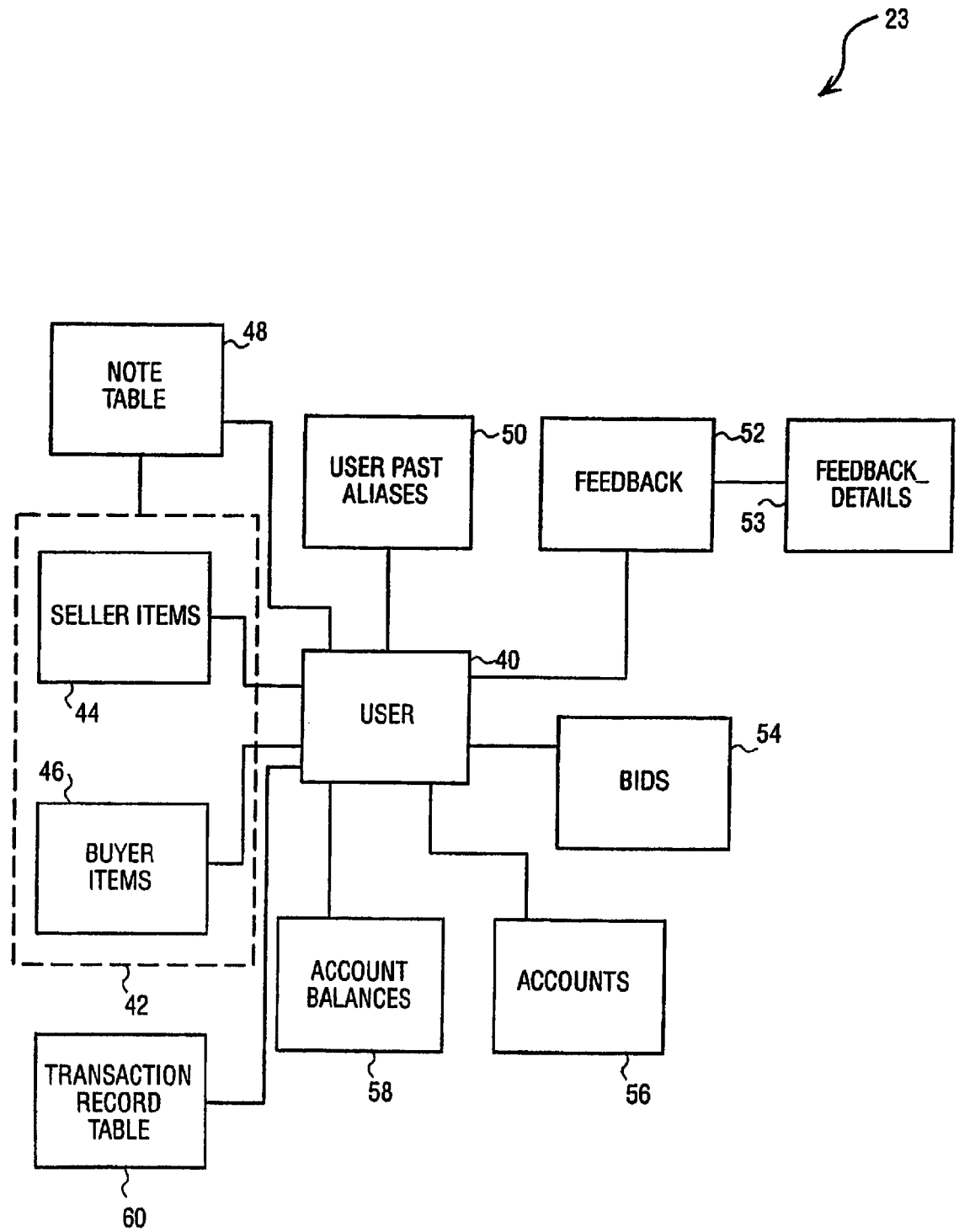
FIG. 2 is a database diagram illustrating an exemplary database for the transaction facility.

An embodiment of an electronic transaction facility is shown in FIGS. 1 and 2.

FIG. 1 is a block diagram illustrating an exemplary network-based transaction facility in the form of an Internet-based auction facility 10. While an exemplary embodiment is described within the context of an auction facility, it will be appreciated by those skilled in the art that the methods and machine readable mediums described herein may find application in many different types of computer-based, and network-based, commerce facilities. It will also be appreciated by those skilled in the art that auction facilities of other architectures may be utilized. The instructions stored in the auction facility (which can be executed by a processor) can be stored on a machine-readable medium including, but not limited to read only memory (ROM), random access memory (RAM), magnetic disk storage media, optical storage media, flash memory devices, or electrical, optical, acoustical or other form of propagated signals.

The auction facility 10 includes one or more of a number of types of front-end servers, namely page servers 12 that deliver web pages (e.g., markup language documents), picture servers 14 that dynamically deliver images to be displayed within Web pages, listing servers 16, CGI servers 18 that provide an intelligent interface to the back-end of auction facility 10, and search servers 20 that handle search requests to the auction facility 10. E-mail servers 21 provide, inter alia, automated e-mail communications to users of the auction facility 10.

The back-end servers include a database engine server 22, a search index server 24 and a credit card database server 26, each of which maintains and facilitates access to a respective database.

The Internet-based auction facility 10 may be accessed by a client program 30, such as a browser (e.g., the Internet Explorer distributed by Microsoft Corp. of Redmond Wash.) that executes on a client machine 32 and accesses the auction facility 10 via a network such as, for example, the Internet 34. Other examples of networks that a client may utilize to access the auction facility 10 include a wide area network (WAN), a local area network (LAN), a wireless network (e.g. a cellular network), or the Plain Old Telephone Service (POTS) (or PSTN) network.

Database Structure

FIG. 2 is a database diagram illustrating an exemplary database 23, maintained by and accessed via the database engine server 22, which at least partially implements and supports the auction facility 10. The database 23 may, in one embodiment, be implemented as a relational database, and includes a number of tables having entries, or records, that are linked by indices and keys. In an alternative embodiment, the database 23 may be implemented as a collection of blocks in an block-oriented database. While FIG. 2 shows one embodiment of a database, it will be appreciated by those skilled in the art that the methods and machine readable mediums described herein may be used with other database structures.

Central to the database 23 is a user table 40, which contains a record for each user of the auction facility 10. A user may operate as a seller, buyer, or both, within auction facility 10. The database 23 also includes item tables 42 that may be linked to the user table 40. Specifically, the item tables 42 include a seller items table 44 and a buyer items table 46. A user record in the user table 40 may be linked to multiple items that are being, or have been auctioned via the auction facility 10. A link indicates whether the user is a seller or a buyer with respect to items for which records exist within the items tables 42. While offerings by the seller are referred to as "items" in the specification, "items" includes any product or service offered by the seller. The database 23 also includes a note table 48 populated with note records that may be linked to one or more item records within the item tables 42 and/or to one or more user records within the user table 40. Each note record within the note table 48 may include, inter alia, a comment, description, history or other information pertaining to an item being auctioned via the auction facility 10 or to a user of the auction facility 10.

A number of other tables are also shown to be linked to the user table 40, namely a user past aliases table 50, a feedback table 52, a bids table 54, an accounts table 56, and an account balances table 58.

Figure 3:
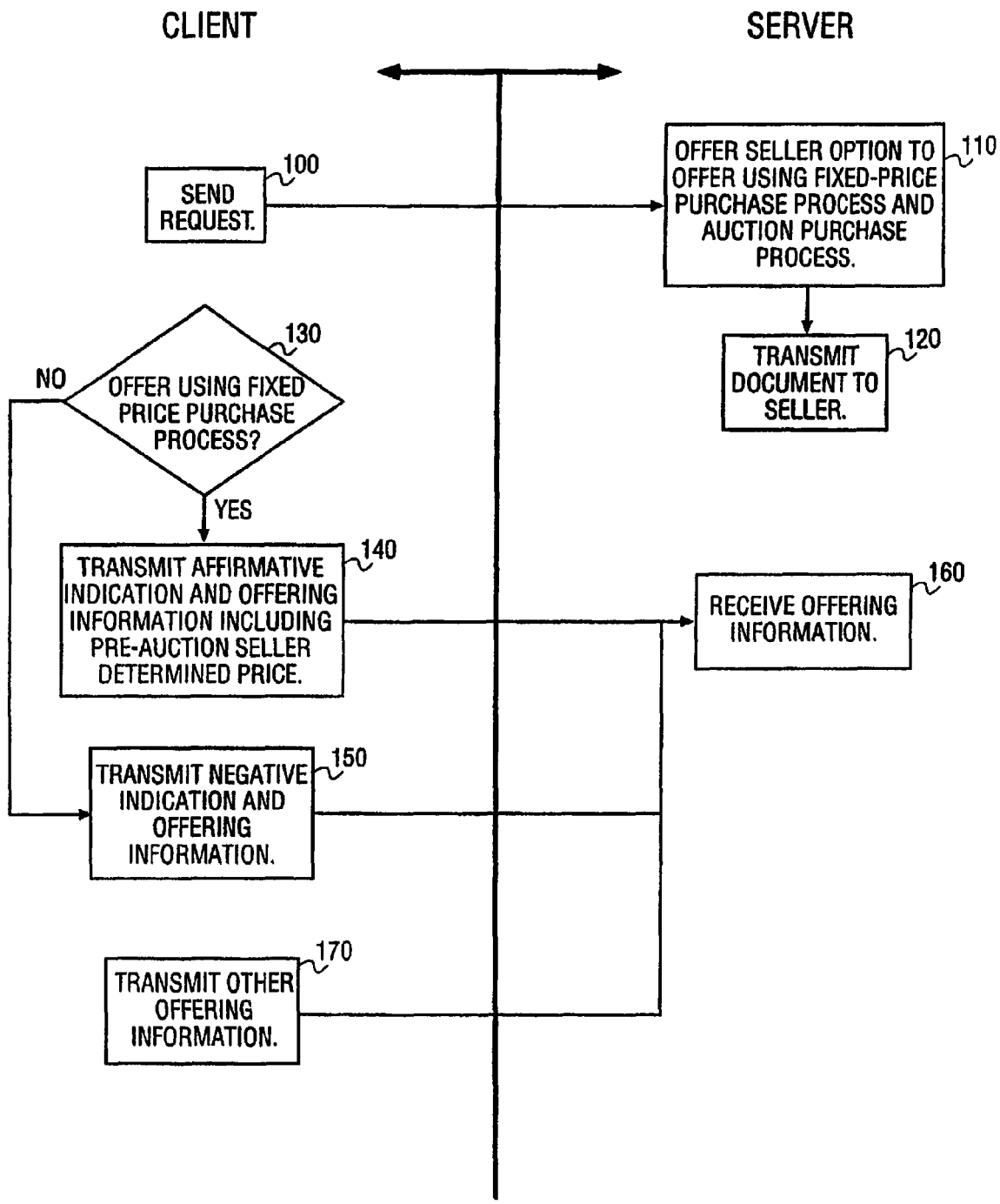
FIG. 3 is a flow chart illustrating an exemplary method of receiving offering information from a seller including whether to offer the item at a pre-auction seller determined price.

FIG. 3 shows a flowchart for an exemplary embodiment of a method to acquire offering information from a seller. The seller issues a listing request (block 100) to the auction facility 10, and the auction facility generates instructions (block 110) offering the seller the option to sell his item using an auction purchase process option and/or a fixed-price purchase process option. After the instructions have been transmitted (block 120), and a page server 12 (see FIG. 1) displays the instructions, the seller decides whether to offer a buyer the chance to buy the offering at a pre-auction seller determined price in a fixed-price purchase process. The seller transmits a purchase process indicator by either an affirmative (block 140) or a negative (block 150). The server can receive and store in note table 48 of database 23 (FIG. 2) this information for later use (block 160). The seller also transmits other offering information, such as a description, picture, reserve price, and contact information to be collected and stored in note table 48 of database 23 (see FIG. 2) (block 160). Optionally, if the seller sends a pre-auction seller determined price that is less than the reserve price he or she sends, the seller can be notified of an error.

Figure 4:
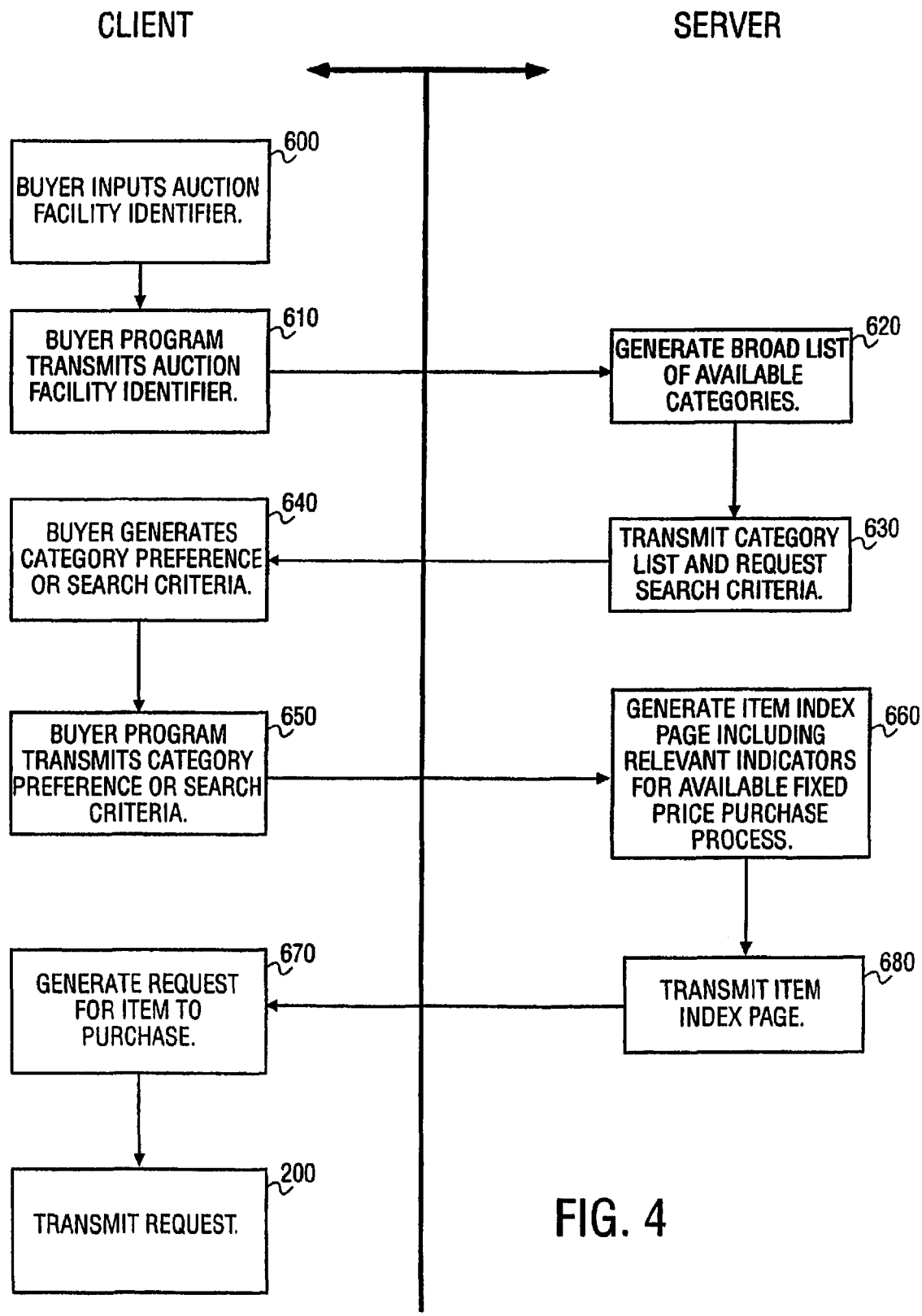
FIG. 4 is a flow chart illustrating an exemplary method of generating a buyer preferred index page using category preferences or search criteria.

FIG. 4 shows a flow chart showing one embodiment of a buyer's interaction with the Internet-based auction facility. The buyer locates the site by inputting the auction facility identifier (block 600) into the client program 30 running on client machine 32 (see FIG. 2) which transmits the auction facility identifier (block 610) through the Internet 34 (See FIG. 1). The Internet-based auction facility receives the transmission and (block 620) a listing server 16 (see FIG. 1) generates a broad list of available categories of items stored in items table 42 (see FIG. 2) for the buyer to select from. The auction facility 10 (block 630) transmits the category list and transmits an interface, which can be presented by a page server 12 (see FIG. 1), to allow the buyer to enter search criteria which may be independent of the category list. The buyer selects a category preference from the category list or generates a search criteria (block 640). The buyer then transmits (block 650) the category preference or search criteria, again, through the Internet 34 (see FIG. 1). Upon receipt of the category preference or search criteria, the auction facility uses a search server 20 (see FIG. 1) to generate an item index page of relevant offerings including visual indicators displayed in respect to items in which the seller is allowing a buyer to buy the item at a pre-auction seller determined price (block 660). The item index page is transmitted to the buyer (block 680). After receiving the item index page (block 670), the buyer generates a request for an item to purchase or bid on. Picture servers 14 (see FIG. 1) can also be used to show the buyer pictures (if available) of the item. The buyer's request is then transmitted (block 200).

Figure 5A:
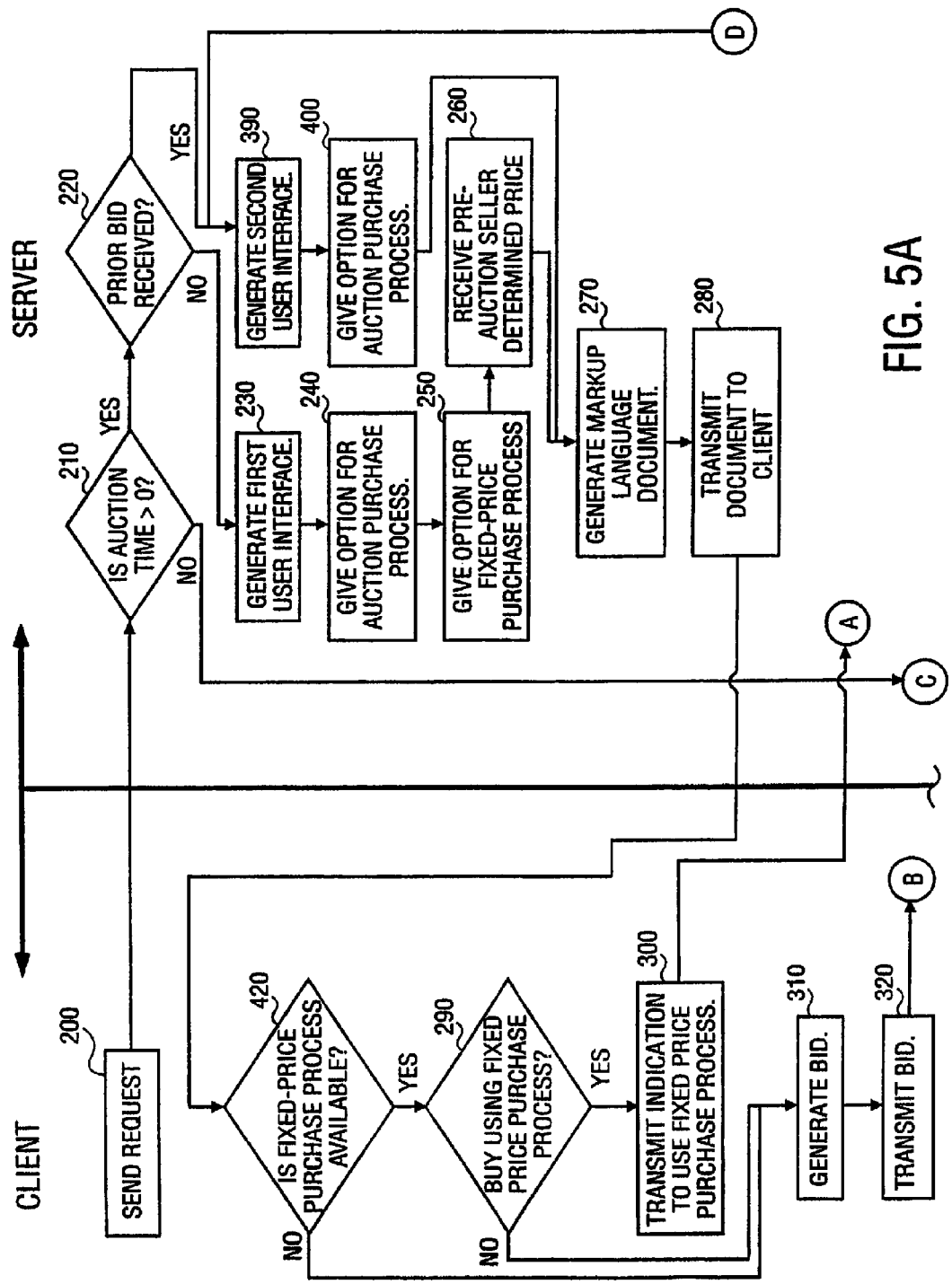
FIGS. 5A and 5B are flow charts illustrating an exemplary method of displaying user interfaces for and conducting an auction facility with an auction purchase process and optionally a fixed-price purchase process.
Figure 5B:
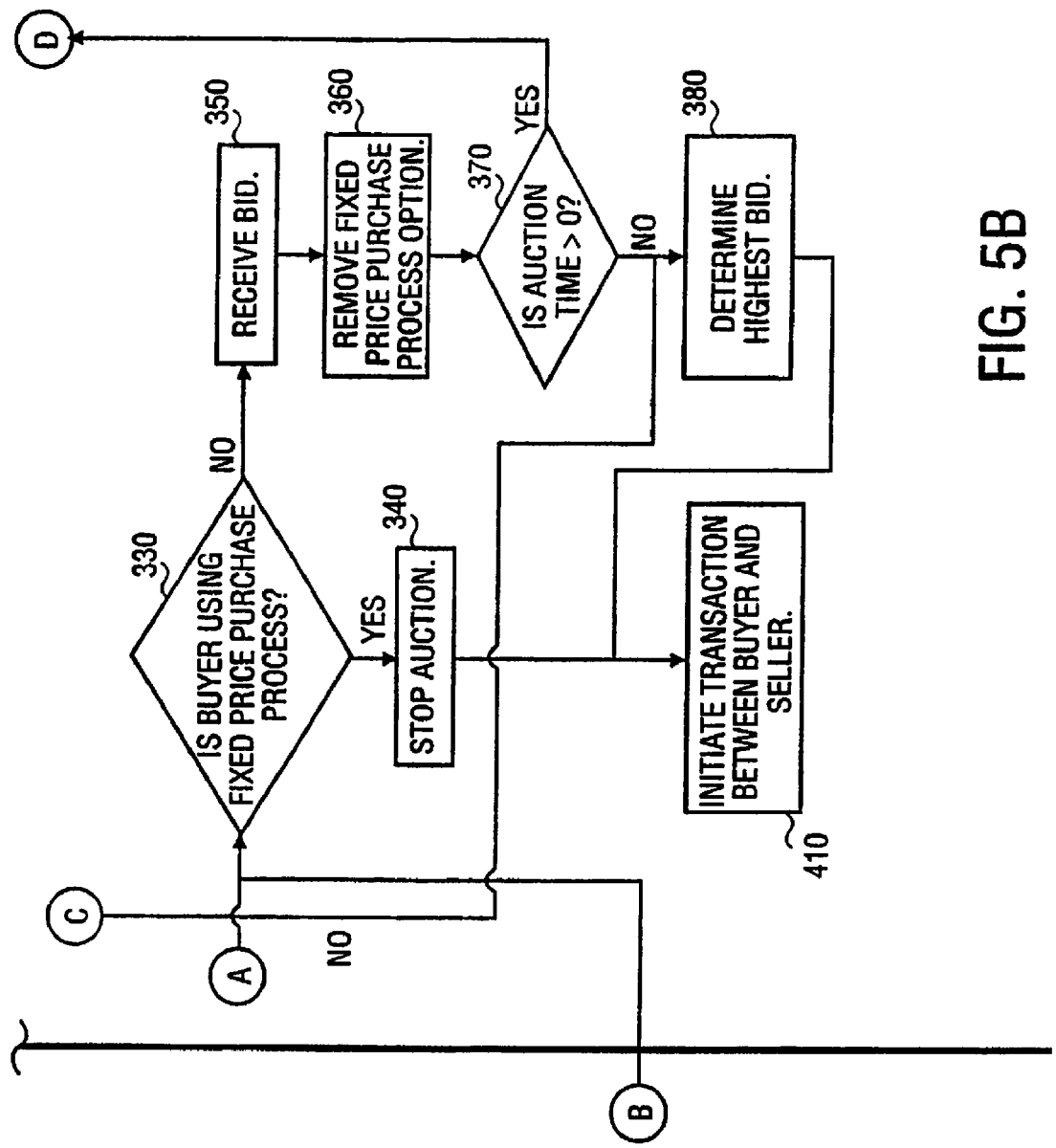

FIGS. 5A and 5B show a flow chart illustrating how the client interfaces with the auction facility, located on a first computer system, when a pre-auction seller determined price is an alternative option to bidding. After the facility receives the buyer's request (block 200), decision block 210 decides if there is still time remaining in the item's auction (item requested by the buyer). If a predetermine period of time has passed, the buyer will not be allowed to place a bid or buy at the pre-auction seller determined price. Instead the auction will end and the highest bidder (if there is one) will be determined (block 380). If there is time remaining, then the determination is made in decision block 220 whether a prior bid has been received. If a prior bid has been received, then the pre-auction seller determined price is no longer available to the buyer and the buyer's only option is to bid. If no prior bid has been received, and the item has a pre-auction seller determined price available, a first user interface will be created (block 230). The auction facility 10 will make the typical auction purchase process available through the user interface (block 240) and will make the fixed price purchase process available to the client (block 250). The pre-auction seller determined price is retrieved for the user interface (block 260). The first user interface is converted into a markup language document suitable for viewing by the buyer (block 270). The generated markup language document is then transmitted for viewing by the buyer on a second computer system using page servers 12 on the first computer system (block 280) (see FIG. 1).

If, at decision block 220, it is determined that an initial bid value has been received, a second user interface will be generated (block 390). The typical auction purchase process is then made available through the user interface (block 400). The second user interface is converted into a markup language document suitable for viewing by the buyer (block 270). The generated markup language document is then transmitted to the buyer (block 280).

After the markup language document has been transmitted to the buyer, a determination is made at decision block 420, based on the transmitted markup language document whether the fixed price purchase process is available to the buyer. If the fixed price purchase process is available to the buyer, the buyer then makes a determination at decision block 290 whether to buy the item at the pre-auction seller determined price or whether to bid on the item. If the buyer chooses to purchase the item using the fixed price purchase process, his indication to buy at the pre-auction seller determined price is transmitted to the auction facility.

If the fixed price purchase process is not available to the buyer (as determined in decision block 420) or fixed price purchase process is available, but the buyer chooses not to use the fixed price purchase process, the buyer generates a bid (block 310). The bid is then transmitted to the auction facility (block 320).

Upon receiving a transmission from the buyer, a determination is made at decision block 330 whether the buyer has chosen the fixed price purchase process. If the buyer has chosen the fixed price purchase process, the auction is stopped (block 340) and a transaction is initiated between the buyer and the seller (block 410). Optionally, the auction facility can check the buyer's credit before stopping the auction.

If the buyer has not opted to use the fixed price purchase process, as determined by the auction facility at decision block 330 (either because it wasn't available or he or she preferred to place a bid instead), the bid is received (block 350). Optionally, if the bid is greater than the pre-auction seller determined price (and the fixed price purchase process is still available), the auction facility may invite the buyer to use the fixed price purchase process. Upon receipt of the bid, the fixed price purchase process option is removed (block 360) and a determination is made at decision block 370 to see if there is any time remaining in the auction. If there is time remaining in the auction, bids can be received and processed in the above manner until there is no more time remaining in the auction. However, if there is no more time remaining in the auction, the highest valid bid is determined from the received bids (block 380), and a transaction is initiated between the highest bidder and the seller (block 410).

FIG. 6 provides an exemplary embodiment of the user interface 500 created at block 110 in FIG. 3 to relay offering options to the seller and collect information on the seller's item. The user interface 500 includes a description (513) that describes an exemplary "Buy It Now" feature that provides the seller the option to allow a buyer to buy the item at a pre-auction seller determined price 514.

FIG. 7 provides an exemplary embodiment of the category list 517 and search criteria request generated by object 620 in FIG. 4. A buyer can generate search criteria (block 640) by typing the search criteria (block 516).

FIG. 8 provides an exemplary embodiment of the item index page generated at block 660 in FIG. 4. A possible placement of the fixed-price purchase process availability icon 518 is shown next to the item. Also displayed in the embodiment of the item index page is a list of prices 514 which could either be the current bid or the pre-auction seller determined price if available.

FIG. 9 shows an exemplary embodiment of the markup language document generated at block 270 in FIG. 5A. Regular auction panel 503 is generated (blocks 240 and 400). Fixed price purchase process panel 504 is generated (block 250) in FIG. 5A. The buyer can submit a bid 520 or, depending on the availability of the fixed price purchase process, can start the fixed price purchase process in panel 504.

Thus methods and machine readable mediums have been described. Although the methods and machine readable mediums have been described with reference to specific exemplary embodiments, it will be evident that various modifications and changes may be made to these embodiments without departing from the broader spirit and scope of the methods and machine readable mediums. Accordingly, the specification and drawings are to be regarded in an illustrative rather than a restrictive sense.

What is claimed:

1. A method including:
   presenting simultaneously, via a first computer system, both an auction purchase process and a fixed-price purchase process for purchase of an item, the presenting done through the use of one or more processors; and
   responsive to receiving a bid for the item, withdrawing the fixed-price purchase process, the receiving and withdrawing done through the use of the one or more processors.

2. The method of claim 1 wherein the presenting includes generating a first interface identifying both the auction purchase process and the fixed-price purchase process.

3. The method of claim 2 wherein the first interface is a markup language document generated at the first computer system, and wherein the presenting includes communicating the markup language document from the first computer system to a second computer system via a network.

4. The method of claim 1 wherein the withdrawing of the fixed-price purchase process includes generating a second interface that identifies only the auction purchase process to a buyer.

5. The method of claim 1 wherein the auction purchase process is presented with an initial bid value and wherein the fixed-price purchase option is presented with a seller determined price.

6. The method of claim 1 including, responsive to the receipt of the bid, as part of the auction process, maintaining only the auction purchase process for a predetermined period of time to receive further bids.

7. The method of claim 6 including, at conclusion of the predetermined time period, establishing an electronic transaction between a winning buyer, who submitted a highest valid bid, and a seller.

8. The method of claim 1 including presenting to a seller a purchase process option to sell the item by both the auction and the fixed-price purchase processes, and receiving a purchase process indication from the seller responsive to the presentation of the purchase process option.

9. A tangible machine-readable medium storing instructions that, when executed by a machine, cause the machine to:
   present simultaneously, via a first computer system, both an auction purchase process and a fixed-price purchase process for purchase of an item; and
   responsive to receipt of a bid for the item, withdraw the fixed-price purchase process.

\* \* \* \* \*